(12) United States Patent
Chen et al.

(10) Patent No.: US 11,587,076 B2
(45) Date of Patent: Feb. 21, 2023

(54) SYSTEMS AND METHODS FOR RESPONSIVE DATA TRANSFER AND ANONYMIZING DATA USING TOKENIZING AND ENCRYPTING

(71) Applicant: Early Warning Services, LLC, Scottsdale, AZ (US)

(72) Inventors: Ming Chen, Kildeer, IL (US); Andy Rolfe, Deerfield, IL (US)

(73) Assignee: Early Warning Services, LLC, Scottsdale, AZ (US)

( * ) Notice: Subject to any disclaimer, the term of this patent is extended or adjusted under 35 U.S.C. 154(b) by 796 days.

(21) Appl. No.: 15/868,749

(22) Filed: Jan. 11, 2018

(65) Prior Publication Data

US 2019/0213587 A1 Jul. 11, 2019

(51) Int. Cl.
*G06Q 20/38* (2012.01)
*H04L 9/14* (2006.01)
*H04L 9/30* (2006.01)
*H04L 9/32* (2006.01)
*G06Q 20/32* (2012.01)
*G06Q 20/10* (2012.01)
(Continued)

(52) U.S. Cl.
CPC ......... *G06Q 20/3829* (2013.01); *G06Q 20/10* (2013.01); *G06Q 20/3223* (2013.01); *G06Q 20/3278* (2013.01); *G06Q 20/3674* (2013.01); *H04L 9/083* (2013.01); *H04L 9/14* (2013.01); *H04L 9/30* (2013.01); *H04L 9/321* (2013.01); *H04L 9/3226* (2013.01); *H04L 9/3228* (2013.01); *H04L 63/0428* (2013.01); *G06Q 20/3226* (2013.01); *G06Q 20/3274* (2013.01); *G06Q 2220/00* (2013.01); *H04L 63/0421* (2013.01); *H04L 2209/56* (2013.01); *H04L 2209/80* (2013.01); *H04W 88/02* (2013.01)

(58) Field of Classification Search
CPC ............... G06Q 20/3829; G06Q 20/10; G06Q 20/3223; G06Q 20/3278; G06Q 20/3674; G06Q 20/3226; G06Q 20/3274; G06Q 2220/00; H04L 9/083; H04L 9/14; H04L 9/30; H04L 9/321; H04L 9/3226; H04L 9/3228; H04L 63/0428; H04L 63/0421; H04L 2209/56; H04L 2209/80; H04W 4/80; H04W 88/02; H04W 12/03; H04W 12/084
See application file for complete search history.

(56) References Cited

U.S. PATENT DOCUMENTS 10,121,129 B2 * 11/2018 Kalgi ................. G06Q 20/3278
10,963,868 B1 * 3/2021 McCauley ......... G06Q 20/4037
(Continued)

*Primary Examiner* — John W Hayes
*Assistant Examiner* — Taylor S Rak
(74) *Attorney, Agent, or Firm* — Kilpatrick Townsend & Stockton LLP

(57) ABSTRACT

Described herein are systems and methods for securely obtaining payment information from a recipient on a payer's mobile device within an application on the payer's mobile device. The securely obtained information can be decrypted in the application, and the recipient information can be extracted. The extracted recipient information can be validated and used by the application to initiate a fund transfer to the recipient's account from the payer's account. The application can include a user interface that can allow the payer to anonymize the payment, securing the privacy of the payer.

20 Claims, 10 Drawing Sheets

(51) Int. Cl.
*H04L 9/40* (2022.01)
*H04L 9/08* (2006.01)
*G06Q 20/36* (2012.01)
*H04W 88/02* (2009.01)

(56) References Cited

U.S. PATENT DOCUMENTS

| | | | |
|---|---|---|---|
| 2012/0209749 A1* | 8/2012 | Hammad | G06Q 20/3674 |
| | | | 705/27.1 |
| 2016/0005043 A1* | 1/2016 | Goldstone | G06Q 20/3223 |
| | | | 705/44 |
| 2016/0267465 A1* | 9/2016 | Metral | G06Q 20/3278 |
| 2017/0046671 A1* | 2/2017 | Shauh | G06Q 30/0601 |
| 2018/0089660 A1* | 3/2018 | Elliott | G06Q 20/383 |
| 2019/0156167 A1* | 5/2019 | Singh | G06Q 20/3827 |

* cited by examiner

You have received a request for payment.

Recipient: John Doe's Valet — 705

Amount: $10.00 — 710

Tip: [ $ ] — 715

Anonymous? [ ] — 720

Account: [ Checking ...3692 ▼ ] — 725

Pay Date: [    ] [📅] — 730

Notes: [            ] — 735

[ Pay ] — 740        [ Cancel ] — 745

FIG. 7

SYSTEMS AND METHODS FOR RESPONSIVE DATA TRANSFER AND ANONYMIZING DATA USING TOKENIZING AND ENCRYPTING

BACKGROUND

There are situations in which a user may be interested in making an electronic transfer of funds for payment from the user's account to a recipient's account (e.g., making payment for a service, sharing the cost of a bill, and so forth). However, in many of these situations, the recipient is unknown to the user (e.g., paying and/or tipping a valet, street vendors, and so forth). Accordingly, a way to securely obtain information from an unknown recipient is needed.

BRIEF SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method that can include receiving, at a mobile device of a payer, a first encrypted message, the first encrypted message associated with a recipient. The method can also include decrypting, at the mobile device, the first encrypted message to generate a decrypted message. The method can also include extracting, at the mobile device, a recipient token from the decrypted message, the recipient token being a unique public identifier of the recipient. The method can also include displaying, at the mobile device, a user interface of an application including fields for entering parameters for making a payment, where the recipient token is displayed in a recipient field for the recipient parameter. The method can also include receiving, at the mobile device via the user interface of the application, the parameters. The method can also include generating, at the mobile device, a second encrypted message including instructions to make the payment to an account of the recipient from an account of the payer according to the parameters. The method can also include transmitting, from the mobile device, the second encrypted message to a payment service computer system responsible for facilitating the payment to the account of the recipient from the account of a payer according to the instructions. Other embodiments of this aspect include corresponding computer systems, apparatus, and computer programs recorded on one or more computer storage devices, each configured to perform the actions of the methods.

Implementations may include one or more of the following features. Optionally, the first encrypted message can be received from the recipient's mobile device. The method can optionally include reading, at the mobile device, a barcode containing the first encrypted message. Optionally, the barcode can be generated on a second mobile device. Optionally, the first encrypted message can be received from a second mobile device using near field communication ("NFC"). Optionally, the first encrypted message can be received from a second mobile device using Bluetooth® communication. Optionally, the parameters include an anonymous payer parameter, and the second encrypted message includes instructions to make the payment to the recipient without disclosing the payer of the payment to the recipient of the payment. Optionally, the recipient token is time dependent. Optionally, the first encrypted message can include a payment amount, and the method can further include extracting, at the mobile device, the payment amount from the decrypted message. Further, the method can include that the payment amount is displayed in a payment amount field for the payment amount parameter. Optionally, the user interface can include a tip field for entering a tip parameter. Optionally, the second encrypted message can include instructions to send a total payment including a value of the tip parameter plus the payment amount from the account of the payer to the account of the recipient. Optionally, the account of the recipient can be determined by the payment service computer system based on the recipient token. Optionally, the first encrypted message can be decrypted using a key available from the application on the mobile device of the payer. Implementations of the described techniques may include hardware, a method or process, or computer software on a computer-accessible medium.

BRIEF DESCRIPTION OF THE DRAWINGS

FIG. 7 illustrates another exemplary user interface according to an embodiment.

DETAILED DESCRIPTION

The need for quickly paying a recipient often comes up, and with the advent of fast, electronic fund transfers between accounts, this need can be met without the use of cash. However, often the payer does not know the recipient (e.g., the recipient contact information is not in the payer's contact list). To send a fund transfer, some identifying information from the recipient is needed to initiate the transfer to the correct person. As an example, a user may use a valet service at a restaurant and need to quickly pay and/or tip the valet without having any cash. However, the user does not know the valet's information. Further, the necessary information, such as a phone number or email address, which can be used to identify the recipient, is not always easily obtained. If the recipient were to simply say the information (e.g., the phone number or email address), the information is not securely transferred and the entry of the information is error prone (e.g., transposing characters, mis-hearing, and/or mis-typing characters are each easily done). Further, the payer, upon payment to the valet through existing funds transfers provides identifying information to the recipient that may not be desired. In the case of a valet, for instance, the payer may not want the valet to have his or her name, email address, phone number, bank account number, or any other identifying information.

The systems and methods described herein resolves those issues by providing a secure transmission of recipient information to the payer's mobile device using tokenizing and encryption. Further, validation of the recipient can ensure that the payer is paying a valid recipient. Further described are methods and systems that give the payer an option to anonymize payment, securing the privacy of the payer.

Figure 1:
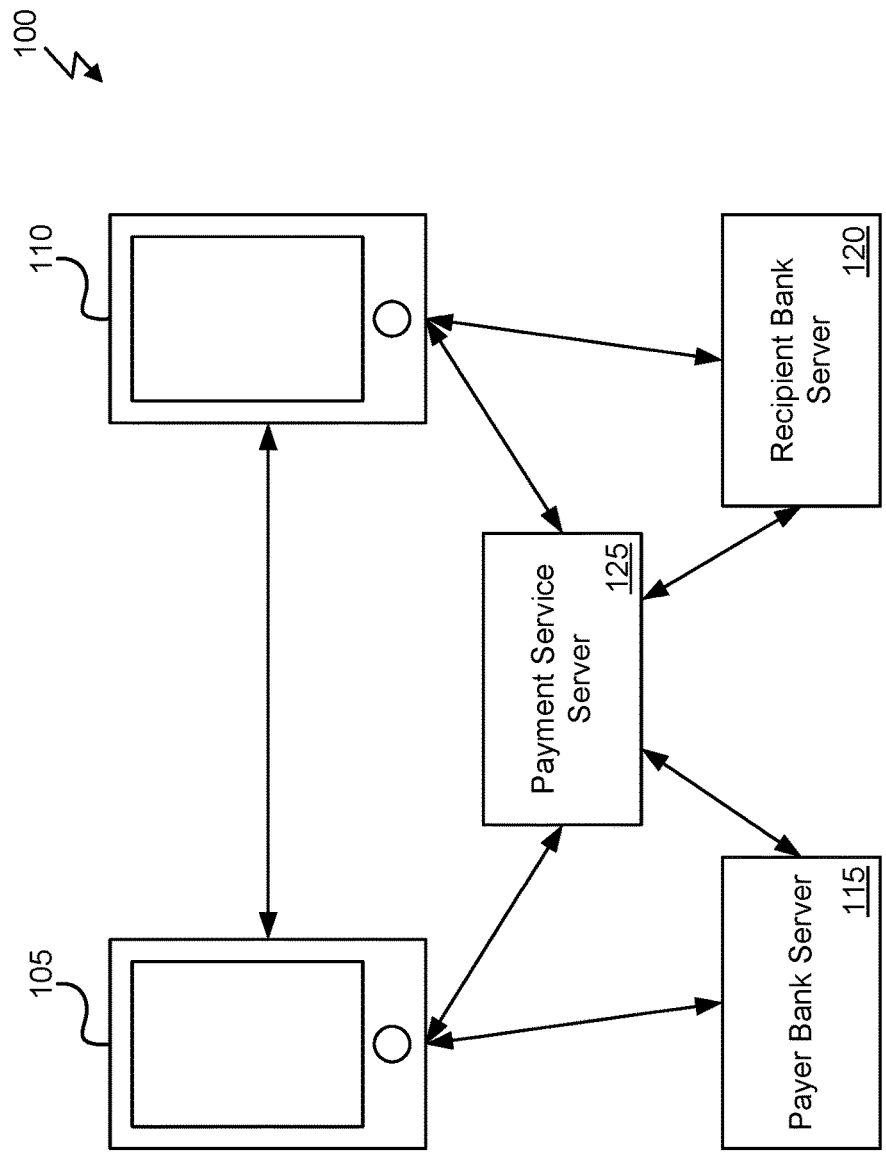
FIG. 1 illustrates an exemplary system for responsive data transfer and anonymizing data using tokenizing and encryption according to an embodiment.

FIG. 1 illustrates an exemplary system 100 that shows a simplified diagram of the components used for responsive data transfer and anonymizing data using tokenizing and encryption. System 100 includes a payer device 105, a recipient device 110, a payer bank server 115, a recipient bank server 120, and a payment service server 125.

The payer device 105 can be any suitable mobile device such as a smartphone, tablet, smartwatch, laptop computer, and the like. The payer device 105 can be a computer system such as computer system 1000 described with respect to FIG. 10. The payer device 105 can execute an application that can facilitate the secure transmission of information and initiate payment as described in detail herein. The payer device can communicate with the payer bank server 115 and/or the payment service server 125 over any suitable network such as, for example, the Internet, Cellular network, Wi-Fi, Wi-Max, a proprietary network, or the like. Optionally, the payer device 105 can communicate with the recipient device 110 using, for example, near-field communication ("NFC"), Bluetooth® communication, and the like.

The recipient device 110 can be any suitable mobile device such as a smartphone, tablet, smartwatch, laptop computer, and the like. The recipient device 110 can be a computer system such as computer system 1000 described with respect to FIG. 10. The recipient device 110 can execute an application, which can be the same application executed by the payer device 105, that can facilitate the secure transmission of the recipient's information to the payer's device as described in detail herein. The recipient device can communicate with the recipient bank server 120 and/or the payment service server 125 over any suitable network such as, for example, the Internet, Cellular network, Wi-Fi, Wi-Max, a proprietary network, or the like. Optionally, the recipient device 110 can communicate with the payer device 105 using, for example, near-field communication ("NFC"), Bluetooth® communication, and the like.

The payer bank server 115 can be any suitable server provided by a banking institution that provides to customers (such as the payer) banking functionality, typically through a banking application, that can execute on the payer's device. Similarly, the recipient bank server 120 can be any suitable server provided by a banking institution that provides to customers (such as the recipient) banking functionality, typically through a banking application, that can execute on the recipient's device. Optionally, the payer bank server 115 and the recipient bank server 120 are the same server and/or operated by the same banking institution. The payer bank 115 and the recipient bank 120 can communicate over a network (such as the Internet, Cellular network, Wi-Fi, Wi-Max, a proprietary network, or the like) with the payment service server 125.

The payment service server 125 can be associated with a payment service that is configured to facilitate interbank fund transfers (e.g., a payment service provided by a non-bank entity). The payment service may, for example, be an entity that is formed as a joint venture between banks and/or other entities that send and receive funds using a fund transfer system, such as an automated clearing house. As another example, the payment service may be a third party vendor. As another example, the payment service may be a service provided for an online community of individuals where such individuals obtain user names/login IDs or otherwise become registered members. The individuals may, for example, use the service to interact with each other. Examples of online communities include MSN®, iPhone® users, Facebook®, LinkedIn®, and so on. The payment service may, for example, be an additional service that is offered to the members of the online community. As another example, the payment service may be provided by one of the banks (i.e., such that the bank performs both the operations described herein as being performed by the bank servers 115 and 120 and the operations described herein as being performed by the payment service server 125). The payment service server 125 can also be referred to herein as a payment service computer system.

In use, the recipient device 110 can generate, using the application, a secure message that can provide information that can allow a payer to pay the recipient through a fund transfer. For example, the recipient can use a user interface of the application, such as the user interface 500 of FIG. 5 to generate the message. Optionally, the secure message can be generated by a different device other than the recipient device, such as, for example, a second device of the recipient or a business device for which the recipient is an employee. The message can include a recipient token, which can represent a unique public identifier of the recipient. For example, a recipient token can be any unique identifier including an email address, a telephone number, a randomly assigned unique identifier, or any other suitable identifier. The secure message can further include a payment amount for the payer. The message can be secure by, for example, encrypting the message. For example, the application can use a private or public key to encrypt the message (i.e., either asymmetric or symmetric encryption). Optionally, the message can be secured by digitally signing the message (e.g., asymmetric encryption of a hashed value). Optionally, the message can be secured by adding a random or time dependent value to the message. The message can be in the form of, for example, a barcode (including a numeric barcode, an alphanumeric barcode, a matrix barcode (e.g., a QR code®), a non-standard matrix barcode), an encoded audio stream, or any other suitable format. The payer device can obtain the secure message through any suitable means such as using a unidirectional or bidirectional wireless technology (e.g., Wifi®, Zigbee®, Z-Wave®, NFC, Bluetooth®, and so forth). For example, the payer device can read a barcode from the recipient device or use any method of transferring data between devices including capturing a picture with the first device's camera of an encoded image which is displayed on the second device. Optionally, the recipient can print the barcode and display the barcode and any payer with a mobile device having the application can read the barcode. Optionally, the payer's device can use NFC to obtain the secure message. Optionally, the payer's device can obtain the secure message through a Bluetooth® connection with the recipient's device. Optionally, the recipient's device can send the message as a beacon, which the payer's device can detect and utilize.

The payer's device can, upon receipt of the secure message, decrypt the message with a key utilized by the application. The application can exchange public and/or private keys for use between user devices (e.g., the payer device 105 and the recipient device 110), between the user device (e.g., the payer device 105 or the recipient device 110) and the payment service server 125, or between the user device (e.g., the payer device 105 or the recipient device 110) and the bank server (e.g., payer bank server 115 or recipient bank server 120). Upon decryption of the message, the application can extract the recipient token and any other information contained in the message. For example, the secure message can include additional information including a payment amount, a display name (e.g., a nickname), or any other suitable information. Optionally, the application can communicate with the payment service server 125 to determine whether the recipient token is valid. The payment service server 125 can validate that the recipient token corresponds to a valid account within the payment service server database, within the payment network, or with another non-member bank, as described in further detail with respect to FIG. 3. If the recipient token is validated, the payment service server 125 can respond with a validation message to the payer device 105. Optionally, the validation message can include a display name such as a nickname or any suitable public name for display to the payer on the payer device 105. Optionally, the secure message can include a display name.

Once the payer device 105 has received validation if validation was requested or, alternatively, after extracting the recipient token and any other information contained in the message if validation is not requested, the application can display a message or provide a notification in the user interface that the payer has received a request for payment. For example, the user interface can cause any type of alert to notify the payer that the payer has the information to pay the recipient including an audible alert, a vibration alert, a visual notification, and the like. The user interface can display a payment screen such as, for example, the user interface 700 of FIG. 7. The payer can enter any additional information such as, for example, a tip amount, whether the payment should be anonymous, notes, a payment date, an account to pay from (for example if the payer has multiple accounts registered with the application) and so forth. Optionally, the payer can reduce the payment amount if desired. Once the payer has entered the information to his or her liking, the payer can initiate the transfer. Optionally, upon receipt of the message through, for example, scanning the barcode generated by the recipient, the application can interpret the scanning as approval to make payment to the recipient in the amount requested without further input by the payer. Once the application has all the information for making the payment (either through entry in a user interface, scanning of a barcode, or any other suitable means that the application is configured to determine as approval for payment), the application can generate a message to request the transfer.

The message can include, for example, the recipient token, the payer's token or identifier, and the payment amount. The message can optionally include a flag indicating whether the payment should be anonymous, notes entered by the payer, a payment date, and so forth. The payer's token can be, for example, a unique public identifier of the payer, such as described for the recipient token. Alternatively, the payer's token can be a private unique identifier known to the payment service server 125. Upon generation of the message, the application can use a key to encrypt the message. The key can be asymmetric and the application can use the public key for encryption such that the payment service server 125 can use the private key to decrypt the message. Optionally, the message can be secured by digitally signing the message (e.g., asymmetric encryption of a hashed value). Optionally, the message can be secured by adding a random or time dependent value to the message. Optionally, the application can transmit the encrypted message to the payer bank server 115 for processing through an automated clearing house. Optionally, the application can transmit the encrypted message to the payment service server 125.

If the application transmits the encrypted message to the payment service server 125, the payment service server 125 can determine, using a user database, information about the recipient based on the recipient token. For example, the recipient token can correspond to a unique identifier within the user database of the payment service server 125 which can further provide information about which bank the recipient has an account with and the necessary account information needed to initiate a fund transfer such as, for example, an automated clearing house transfer of funds. Optionally, the payment service server 125 can communicate with the recipient bank server 120 to obtain the necessary information to initiate the transfer of funds. Similarly, the payment service server 125 can determine, using the user database, information about the payer based on the payer token (or identifier). Optionally, the payment service server 125 can communicate with the payer bank server 115 to obtain the necessary information to initiate the transfer of funds. Once the information for completion of the transfer is obtained, the payment service server 125 can generate a message to finalize the transfer of funds.

Optionally, the payment service server 125 can generate a message to the payer bank server 115 that includes, for example, the bank account number for the recipient, the bank account number for the payer, the amount, and optionally an anonymous flag. The payer bank server 115 can then transfer the funds from the payer's account to the recipient's account. If the anonymous flag is set, the payer bank server 115 can hide the payer information from the recipient. Optionally, the payment service server 125 can initiate an automated clearing house transfer of funds between the accounts in the amount needed. Again, if the anonymous flag is set, the payment service server 125 can hide the payer information from the recipient. Optionally, the payment service server 125 can generate a message to the recipient bank server 120 that includes, for example, the bank account number for the recipient, the bank account number for the payer, the amount of the transfer, and instructions to hide the payer information from the recipient if the anonymous flag is set.

Upon completion of the transfer of funds, the payer bank server 115 can notify the payment service server 125 that the transfer of funds completed. The application on the payer's device can notify the payer that the transfer of funds was successfully completed. Similarly, upon completion of the transfer of funds, the application on the recipient's device can notify the recipient that the transfer of funds was successfully completed. The notification on the recipient's device can hide or not provide the payer's information if the payer had selected to make the payment anonymously.

Figure 2:
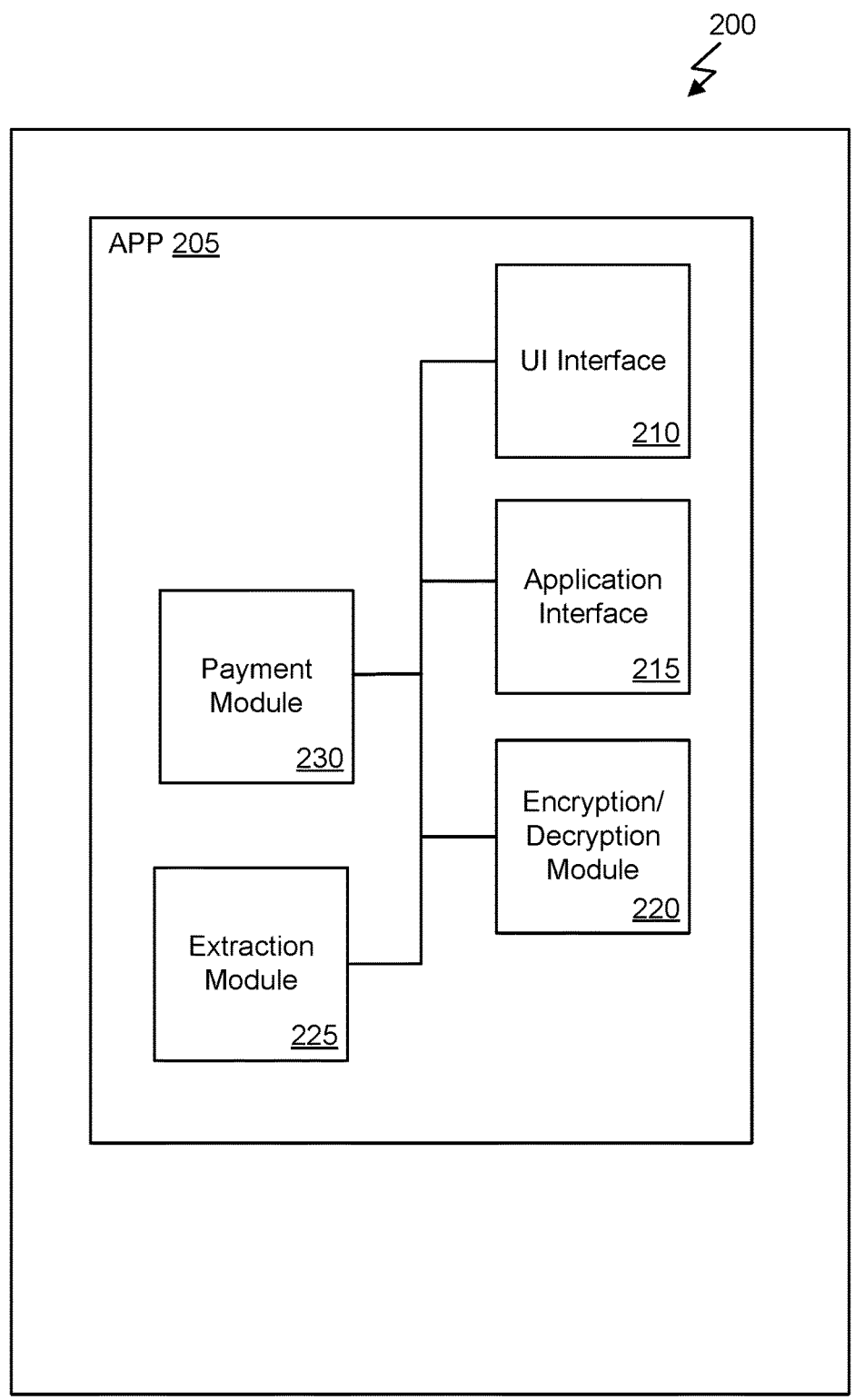
FIG. 2 illustrates an exemplary device for responsive data transfer and anonymizing data using tokenizing and encryption according to an embodiment.

FIG. 2 illustrates an exemplary device 200 with a simplified block diagram for responsive data transfer and anonymizing data using tokenizing and encryption. The device 200 can be, for example, the payer device 105 of FIG. 1 or the recipient device 110 of FIG. 1. The device 200 can be a computer system, such as computer system 1000 of FIG. 10.

The device 200 can be, for example, a smartphone, a tablet, a smartwatch, a laptop computer, or any other suitable device. The device 200 can include an application 205. The application 205 can include a UI interface 210, an application interface 215, an encryption/decryption module 220, an extraction module 225, and a payment module 230. Though described as having various modules, the functionality of modules and interfaces 210, 215, 220, 225, and 230 can be combined into fewer modules and interfaces or disbursed into more modules and interfaces without affecting the functionality of the application 200 described herein. Each of the modules and interfaces 210, 215, 220, 225, and 230 can communicate with the other modules and interfaces 210, 215, 220, 225, and 230 to exchange information and process data as needed to provide the described functionality.

Figure 5:
FIG. 5 illustrates an exemplary user interface according to an embodiment.

The UI interface 210 can provide an interface with a display device of the device 200 for displaying the user interface described herein. For example, FIGS. 5 and 7 show exemplary user interfaces that are displayed on a display of device 200 through UI interface 210.

The application interface 215 can provide the application 205 executing on a first device 200 (e.g., the payer's device 105 of FIG. 1) with an interface to communicate with the application 205 executing on a second device 200 (e.g., the recipient's device 110 of FIG. 1). For example, the application interface 215 can provide a barcode reader or an interface to a barcode reader on device 200 for reading a barcode from a second device 200 that can be displayed on the second device 200 via the user interface of application 205.

The encryption/decryption module 220 can encrypt and/or decrypt messages received by the application 205 using public and/or private keys that are provided within the system 100. For example, a public/private key pair can be assigned to payer device 105 and payment service server 125 such that the payer device 105 has the public key and the payment service server 125 has the private key. A message sent to the payment service server 125 from the payer device 105 can be encrypted with the public key by encryption/decryption module 220 before transmission. The payment service server 125 can use the corresponding private key to decrypt the message, ensuring that other devices or servers that do not have the private key cannot decrypt the message and access the information contained in the message. Similarly, messages sent from the payment service server 125 can be encrypted with the private key and the encryption/decryption module 220 on the payer's device 105 can decrypt the message with the corresponding public key. Additionally, the encryption/decryption module 220 on, for example, the recipient device 110 can encrypt messages sent to, for example, the payer's device 105 using a symmetric key known in the application. While less secure than asymmetric encryption, the tokenizing of the recipient identifier helps maintain the security of the information. Optionally, the encryption/decryption module 220 can secure messages by digitally signing the message (e.g., asymmetric encryption of a hashed value). Optionally, the message can be secured by adding a random or time dependent value to the message by the encryption/decryption module 220. As used herein, messages that are encrypted can be secured through any one or more of key encryption, digital signing, adding a random value, and/or adding a time dependent value to the message.

The extraction module 225 can extract information from the decrypted messages. For example, the recipient token transmitted in the encrypted message sent from the recipient device 110 to the payer device 105 can be extracted from the decrypted message by the extraction module 225.

The payment module 230 can generate the message for requesting a fund transfer. For example, the payment module 230 executing in the application 205 on recipient device 110 can generate the message to request payment from the payer. The message can be generated by including, for example, a payment amount as well as a recipient token (e.g., the public, unique identifier discussed above) in a message for transmission to the payer device 105. The payment module 230 can send the message to the encryption/decryption module 220, which can encrypt the message before transmission. The encryption/decryption module 220 can send the encrypted message to the UI interface 210 for display of the encrypted message (e.g., a generated barcode) and/or to the application interface 215 for transmission to, for example, the payer device 105. With respect to the payer device 105, the payment module 230 can generate the payment message that can include the recipient token, a payment amount, and a payer identification, as well as optionally, a payment date, an anonymous flag, notes, and the like. The payment message can be encrypted by the encryption/decryption module 220 and transmitted through the application interface 215 to the payment service server 125.

Figure 3:
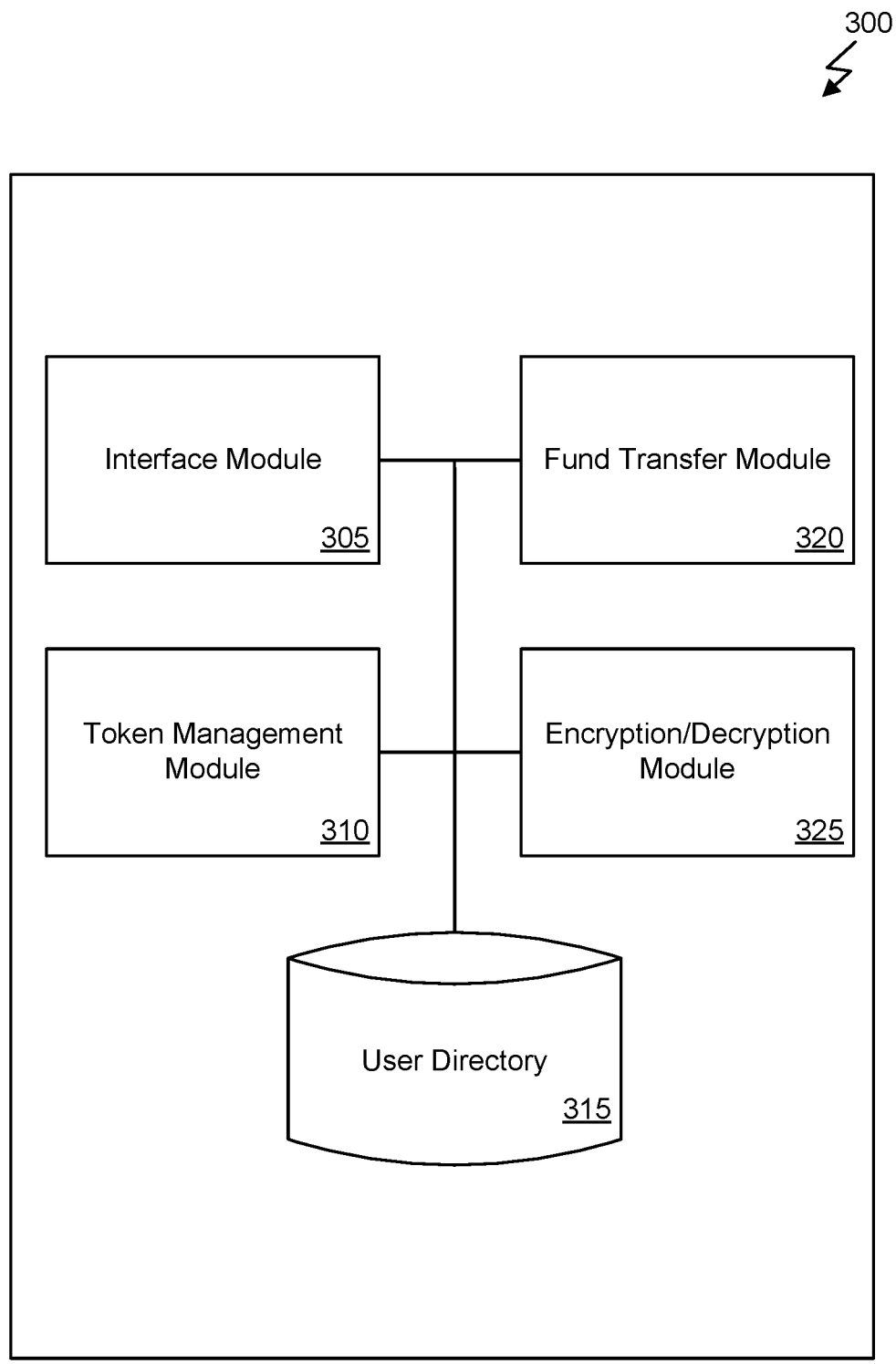
FIG. 3 illustrates an exemplary payment service server according to an embodiment.

FIG. 3 illustrates an exemplary payment service server 300 in a simplified block diagram. The payment service server 300 can be, for example, the payment service server 125 of FIG. 1. The payment service server can be a computer system such as computer system 1000 of FIG. 10. The payment service server can include an interface module 305, a token management module 310, a user directory 315, a fund transfer module 320, and an encryption/decryption module 325. Though described as having various modules and interfaces, the functionality of modules and interfaces 305, 310, 315, 320, and 325 can be combined into fewer modules and interfaces or disbursed into more modules and interfaces without affecting the functionality of the payment service server 300 described herein. Each of the modules and interfaces 305, 310, 315, 320, and 325 can communicate with the other modules and interfaces 305, 310, 315, 320, and 325 to exchange information and process data as needed to provide the described functionality.

Interface module 305 can provide an interface for the payment service server 300 to communicate on a network, such as, for example, the Internet, Cellular network, Wi-Fi, Wi-Max, a proprietary network, or the like. Using the interface module 305, the payment service server 300 can send and receive messages from, for example, payer device 105 and/or recipient device 110 as described in FIG. 1.

Token management module 310 can manage tokens. For example, the token management module can register tokens, authenticate tokens, generate tokens, and the like. As an example, when a new user registers with the payment service server 300, the token management module 310 can register a token for the user. Optionally, the token management module 310 can generate the token as well. Optionally, the token management module 310 can facilitate identification of the recipient when a token is not recognized. Optionally, tokens registered for a user can expire. The user's token can be provided to the user device upon registration. Additionally, a public key for use in asymmetric encryption can be provided to the user device upon registration.

The user directory 315 can be used when a token or other identifier is used to identify a payer or recipient (as opposed to a bank account/routing number). For example, if an email address, phone number, Universal Payment Identification Code ("UPIC"), randomly generated number, or the like is used as a token or identifier, the user directory 315 can provide a correlation between the token (or identifier) and the bank account/routing number of the user identified by the token or identifier. Users (payers/recipients) can register their information in the user directory 315 upon registering with the payment service server 300. The information can include a bank account/routing number, a user name, one or more public tokens (or identifiers), one or more private tokens (or identifiers), and the like.

The fund transfer module 320 can be used to generate the messages to initiate fund transfer between a payer's account and a recipient's account. The fund transfer module 320 can extract and/or obtain the proper information for the fund transfer from the message requesting the fund transfer or can obtain the proper information from the user directory 315.

The encryption/decryption module 325 can encrypt and decrypt messages received or sent. The encryption/decryption module 325 can generate corresponding key pairs (e.g., symmetric key pairs, asymmetric key pairs, and the like) and transmit the keys to the proper devices. For example, when a new user registers by installing the application 205 on a device, the encryption/decryption module 325 can generate a public/private key pair, and maintain the private key on the payment service server 300 by storing it in the user directory 315 with the user's token and other information. The encryption/decryption module 325 can send the public key to the device executing application 205 that was used to register the new user through the interface module 305. Optionally, encryption/decryption module 325 can interface with a server or other computer system (e.g., a computer of the bank or the payment service), and the other computer service can perform the encryption and/or decryption and provide the information back to encryption/decryption module 325 for further use as described herein.

In use, a payer and a recipient can register with the payment service server 300. For example, a payer can register with the payment service server 300 when the payer installs and executes the application 205 on the payer device 105. Upon installation, the application 205 can request user registration information for the payer. When the payer enters the information into the application 205, the information can be securely transmitted to payment service server 300 and is received at the interface module 305. The encryption/decryption module 310 can decrypt the message. The encryption/decryption module 310 can generate a private/public key pair for the user. The token management module 310 can extract the payer's information and generate, for example, a private token and a public token for the user. The token management module can register the user's information (e.g., the user's bank account/routing number, the public and private tokens for the user, the user's name, and the like) in the user directory 315. The interface module 305 can transmit the payer's public token, private token, and public key to the payer's device. The recipient can similarly register with the payment service server 300.

The interface module 305 can receive a fund transfer request from, for example, payer device 105 of FIG. 1. The interface module 305 can transfer the message to the encryption/decryption module 325 for decrypting. If the message is encrypted, the encryption/decryption module 325 can decrypt the message with, for example, a private key corresponding to the public key used to encrypt the message. Once decrypted, the token management module 310 can extract the tokens and/or identifiers for the payer and the recipient from the decrypted message. The token management module 310 can utilize the user directory 315 to identify the bank account/routing number for the payer and recipient. In some scenarios the recipient may not be registered in the user directory 315. In such scenarios, the token management module 310 can use the payer information to query the payer bank server (e.g., payer bank server 115 of FIG. 1) for recipient information (e.g., a recipient unique identifier and bank institution associated with the recipient unique identifier). The query can work if payer bank server (e.g., payer bank server 115) has a user directory similar to user directory 315 and a banking customer has sent and/or received fund transfers from the recipient such that the recipient information is stored in the payer bank server's user directory.

Once the payer and recipient information is obtained, the token management module can transmit a message via the interface module 305 to the payer bank server (e.g., payer bank server 115 of FIG. 1) to initiate the fund transfer. Optionally, upon notification of successful completion of the fund transfer, the payment service server 300 can put an entry in the user directory noting the fund transfer. Optionally, upon notification of successful completion of the fund transfer, the payment service server 300 can send a notification via the application 205 to the payer device 105 and via the application 205 to the recipient device 110. If the payer had requested that the payment be anonymous, the notification to the recipient device 110 can indicate the transfer of funds while keeping the payer information anonymous.

Figure 4:
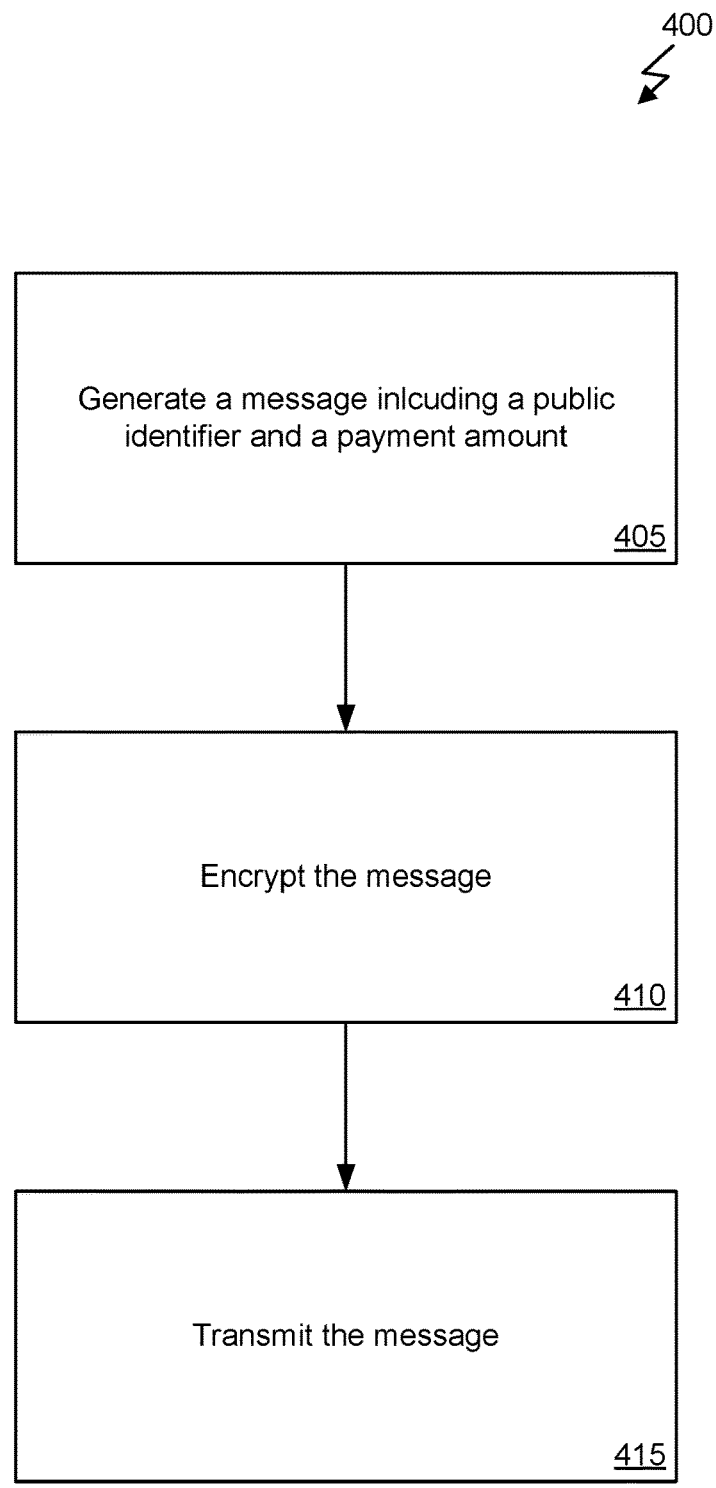
FIG. 4 illustrates an exemplary method for a recipient device for responsive data transfer and anonymizing data using tokenizing and encryption according to an embodiment.

FIG. 4 illustrates an exemplary method 400 for a recipient device for responsive data transfer and anonymizing data using tokenizing and encryption. The method 400 can be executed by, for example, recipient device 110 of FIG. 1. Optionally, method 400 can be executed by any suitable device regardless of the recipient, such as, for example, a device of a business for which the recipient is an employee. The method 400 can begin at step 405 with generating a message comprising a public identifier for the recipient and a payment amount. For example, a public identifier of the recipient can be a recipient token as described with respect to FIG. 1. As an example, if a valet service costs $10, the message can include the valet's public identifier and a payment amount of $10. The message can be generated in any suitable manner for transmitting the information to the payer. For example, the message can be formatted for NFC communication, Bluetooth® communication, or as a beacon. Optionally, the message can be in the format of a barcode, including any suitable type of barcode (e.g., a matrix barcode (for example two-dimensional barcode), an alpha numeric barcode, numeric barcode, an interleaved barcode, and so forth). Optionally, the message can include other information including, for example, a payment due date, a note for the purpose of the payment, or any other suitable information.

Once the message is generated, the message can be encrypted at 410. The encryption of the message can be optional. For example, the recipient may have the ability to choose to not encrypt the message via, for example, a user interface (e.g., user interface 500 of FIG. 5). The message can be encrypted with, for example, an encryption key. The application 205 can provide, for example, a symmetric key to be used for encrypting and decrypting messages sent between devices both executing the application 205.

At step 415, the message can be transmitted to the payer device. Depending on the message, the transmission can be, for example, via NFC, Bluetooth®, or beacon. Optionally, the application 205 can include a barcode reader and the payer device can use the barcode reader to scan the barcode from the application 205 user interface displaying the barcode on the recipient device. For example, the application 205 can utilize the camera on the payer device (e.g., smartphone camera) to take an image of the barcode, and the application 205 can include software instructions that can decode the barcode image. Optionally, the recipient can print the barcode, and the payer can scan the printed barcode with the application 205.

FIG. 5 illustrates an exemplary user interface 500 for generating a barcode or a payment request by the recipient device. The user interface 500 can be used to collect information from the recipient for generation of the message as described in method 400 of FIG. 4. The user interface 500 can be a user interface of application 205 of FIG. 2. The user interface can include an encrypt field 505, an amount field 510, a due date field 515, a notes field 520, a submit button 525, and a cancel button 530. The specific locations depicted in user interface 500 of fields 505, 510, 515, and 520 and buttons 525 and 530 can be modified without affecting the functionality of user interface 500 as described herein. Further, fewer or more fields and or buttons can be included in user interface 500.

Encrypt field 505 can allow a recipient to check a box or make any other suitable entry to indicate that the code or message generated should be encrypted. If the recipient indicates that the message or code should not be encrypted by, for example, not checking the box 505, step 410 of FIG. 4 for encrypting the message can be excluded from method 400 for generation of the message or code.

Amount field 510 can allow the recipient to enter an amount owed by the payer. For example, continuing the valet example, the amount of the valet can be $10, which the recipient (e.g., the valet) can enter into the amount field 510. Due date field 515 can allow the recipient to enter a due date for the payment. For example, the valet can require immediate payment and therefore enter the current date in the due date field 515. The due date field 515 can be optional such that the recipient can leave the due date field 515 blank to indicate there is not a due date. Notes field 520 can allow the recipient to enter notes (e.g., a reason for the payment request), which can be used by the application 205 on the payer device to indicate the reason for the payment to the payer. For example, notes field 520 can be filled in with "Valet at Morton's on Nov. 1, 2017."

If the recipient is happy with the entered information, the recipient can select the submit button 525 to generate the code or message. If the recipient decides to cancel generation of the code, the recipient can select the cancel button 530 to discard the information. If the recipient selects the submit button 525, the application 205 can receive the entered parameters for the encrypt field 505, the amount field 510, the due date field 515, and the notes field 520. The application 205 can then generate the message or code using, for example, payment module 230 of FIG. 2. The message can include the recipient token or identifier, the amount of the payment according to amount field 510, the due date if entered according to due date field 515, the notes entered in notes field 520, a nickname associated with the recipient token or identifier, and any other suitable information. If the encrypt field 505 indicates encryption, the encryption/decryption module 220 of FIG. 2 can encrypt the message or code.

Figure 6:
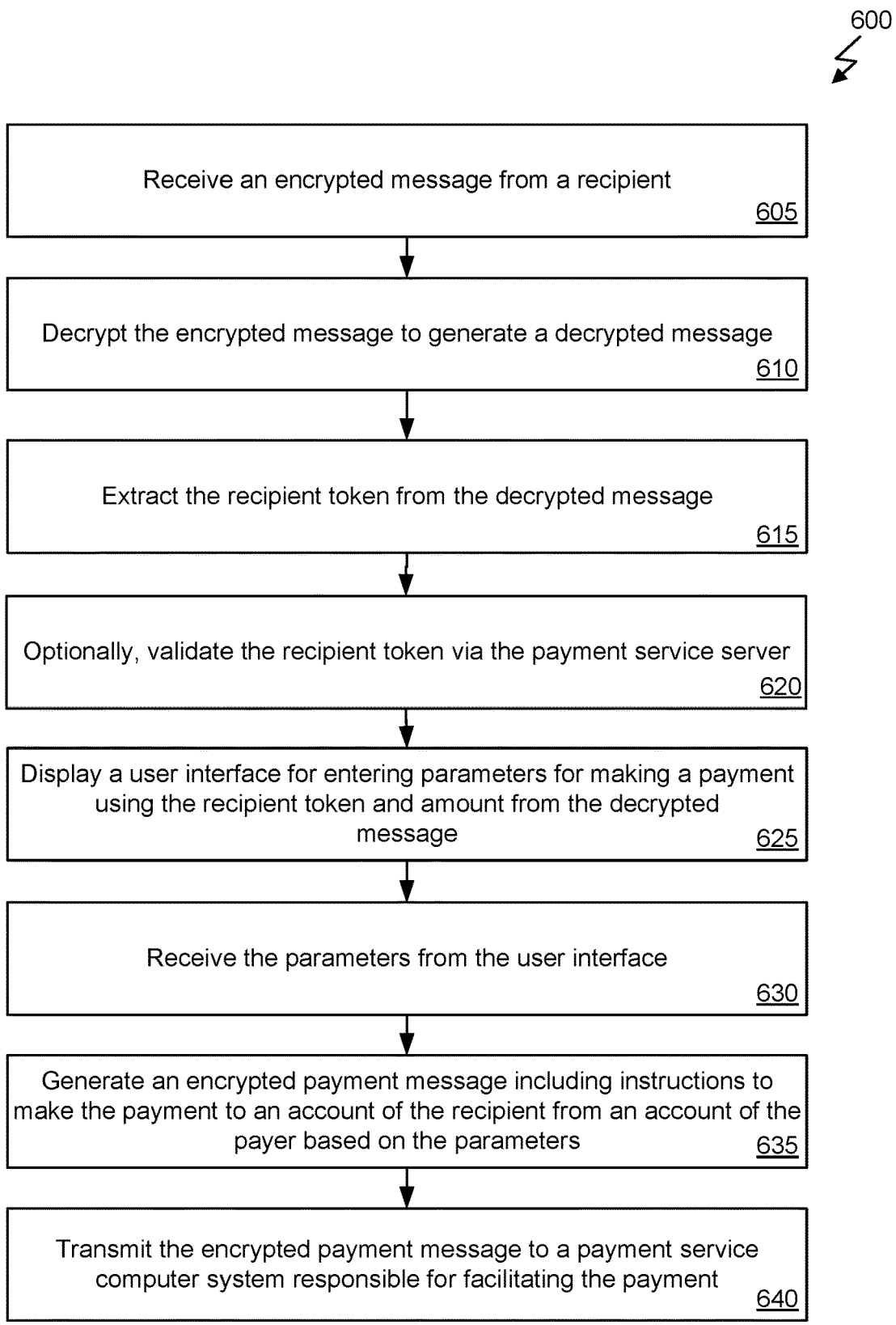
FIG. 6 illustrates an exemplary method for a payer device for responsive data transfer and anonymizing data using tokenizing and encryption according to an embodiment.

FIG. 6 illustrates an exemplary method 600 for a payer device for responsive data transfer and anonymizing data using tokenizing and encryption. The method 600 can be executed by, for example, application 205 of FIG. 2 on payer device 105 of FIG. 1. Method 600 can begin with receiving an encrypted message from a recipient at step 605. The encrypted message can be, for example, the message generated and transmitted by the recipient device as described with respect to method 400 of FIG. 4. The encrypted message can include a payment request including a recipient token or identifier and a payment amount. Optionally, the encrypted message can also include a due date, notes, a nickname for the recipient, and so forth. The encrypted message can be received by, for example, application interface 215 of FIG. 2.

At step 610, the application can decrypt the encrypted message to generate a decrypted message. For example, if a symmetric key known to application 205 is used to encrypt the message, the application 205 can use the symmetric key to decrypt the message. Optionally, the message is not encrypted (e.g., if the user did not select encrypt field 505) and does not need to be decrypted. For example, the encrypted message can be decrypted by encryption/decryption module 220 of FIG. 2.

At step 615, the application can extract the recipient token or identifier from the decrypted message. At step 620, the application can validate the recipient token or identifier by transmitting the recipient token or identifier to the payment service server for validation. The payment service server can utilize the token to identify whether the recipient is registered with the payment service using the user directory (e.g., user directory 315 of FIG. 3). For example, the extraction module 225 of FIG. 2 can extract the information from the decrypted message.

At step 625, the application can display, in a user interface, fields for entering payment parameters. For example, once the payment request is received, a notification can alert the payer that a payment is due or requested. The alert can include a visual alert in the user interface of the application, an audible alert, and/or a physical alert such as a vibration of the payer's device. The user interface can include fields for entering payment, fields that already have values, and/or fields that may or may not be modifiable. For example, the user interface can include a recipient field that includes the nickname of the recipient that was provided in the message. The nickname can be in the recipient field but may not be modifiable. Optionally, the user interface can include an amount field that can also be from the message. For example, the amount sent in the message can be populated into the amount field, which may or may not be modifiable. Optionally, the user interface can include a notes field. The notes can be populated with notes that were transmitted in the message if any were transmitted. The notes field may or may not be modifiable. Optionally, the user interface can include a tip field. The tip field can be populated with a suggestion (e.g., 10% of the amount field), with a value transmitted in the message, with a default value (e.g., $5.00), or it can be blank. Optionally, the user interface can include an anonymous field. The anonymous field can allow the payer to make the payment anonymously, ensuring that the payer's information is not transmitted to the recipient. Optionally, the user interface can include a pay date field that can allow the payer to select the date the payment is to be made. The payment date can be populated with the pay date from the message and may or may not be modifiable. For example, UI interface 210 of FIG. 2 can display the user interface in a display of the device.

At step 630, the application can receive the parameters from the user interface. At step 635, the application can generate an encrypted payment message. The payment message can include each of the entered parameters including, for example, the recipient token or identifier, the amount, a tip amount, the notes, the payment date, and an anonymous flag if the anonymous field was selected. The payment message can further include a payer identifier, which can be a unique public identifier, a unique private identifier, or any other suitable identifier of the payer. For example, the payment module 230 of FIG. 2 can generate the message, and encryption/decryption module 220 of FIG. 2 can encrypt the message.

At step 640, the application can transmit the encrypted payment message to a payment service computer system responsible for facilitating the payment. For example, the application can transmit the encrypted payment message to payment service server 300 of FIG. 3. For example, application interface 215 of FIG. 2 can transmit the encrypted payment message.

FIG. 7 illustrates an exemplary user interface 700 for generating the payment on the payer's device. User interface 700 can be displayed by application 205 on payer device 105. User interface 700 can include a recipient field 705, an amount field 710, a tip field 715, an anonymous field 720, an account field 725, a pay date field 730, a notes field 735, a pay button 740, and a cancel button 745.

The recipient field 705 can be populated with the recipient name or nickname received in the message received from the recipient device. The recipient field 705 can optionally be modifiable. Continuing the valet example, "John Doe's Valet" can be the nickname for the valet used.

The amount field 710 can be populated with the amount received in the message from the recipient device. The amount field can optionally be modifiable. Continuing the valet example, "$10.00" can be the amount of the valet as entered by the recipient and transmitted in the message from the recipient.

The tip field 715 can allow the payer to add a tip to the payment. Anonymous field 720 can allow the user to make the payment anonymously. As described herein, the payer information is not disclosed to the recipient when the payer makes the payment anonymous.

The account field 725 can provide, for example, a dropdown box with entries for each account the payer has from which the payment can be made. The pay date field 730 can be the date the payment should be made. Optionally, the pay date field 730 can be blank, which can cause the payment to be made immediately, for example. Optionally, the pay date field 730 can be populated with the due date value received in the message from the recipient device.

The notes field 735 can allow the payer to enter notes as to what the payment is for. Optionally, the notes field 735 can be populated with the notes received in the message from the recipient device. Continuing the valet example, for example, the notes can include "Valet at Morton's on Nov. 1, 2017." Optionally, the notes field 735 can be modifiable.

If the payer is happy with the entered information, the payer can select the pay button 740 to generate the payment message. If the payer decides to cancel the payment, the payer can select the cancel button 745 to discard the information. If the payer selects the pay button 740, the application 205 can receive the entered parameters for the recipient field 705, amount field 710, tip field 715, anonymous field 720, account field 725, pay date field 730, and notes field 735. The application 205 can then generate the message using, for example, payment module 230 of FIG. 2. The message can include the recipient token or identifier, the amount of the payment according to amount field 710 in addition to the tip field 715, the pay date if entered according to pay date field 730, the notes entered in notes field 735, an anonymous flag if the user selected anonymous field 720, and the payer identifier or token (e.g., as known by application 205). The encryption/decryption module 220 of FIG. 2, for example, can encrypt the message. Application interface 215 can transmit the encrypted message to the payment service server.

Figure 8:
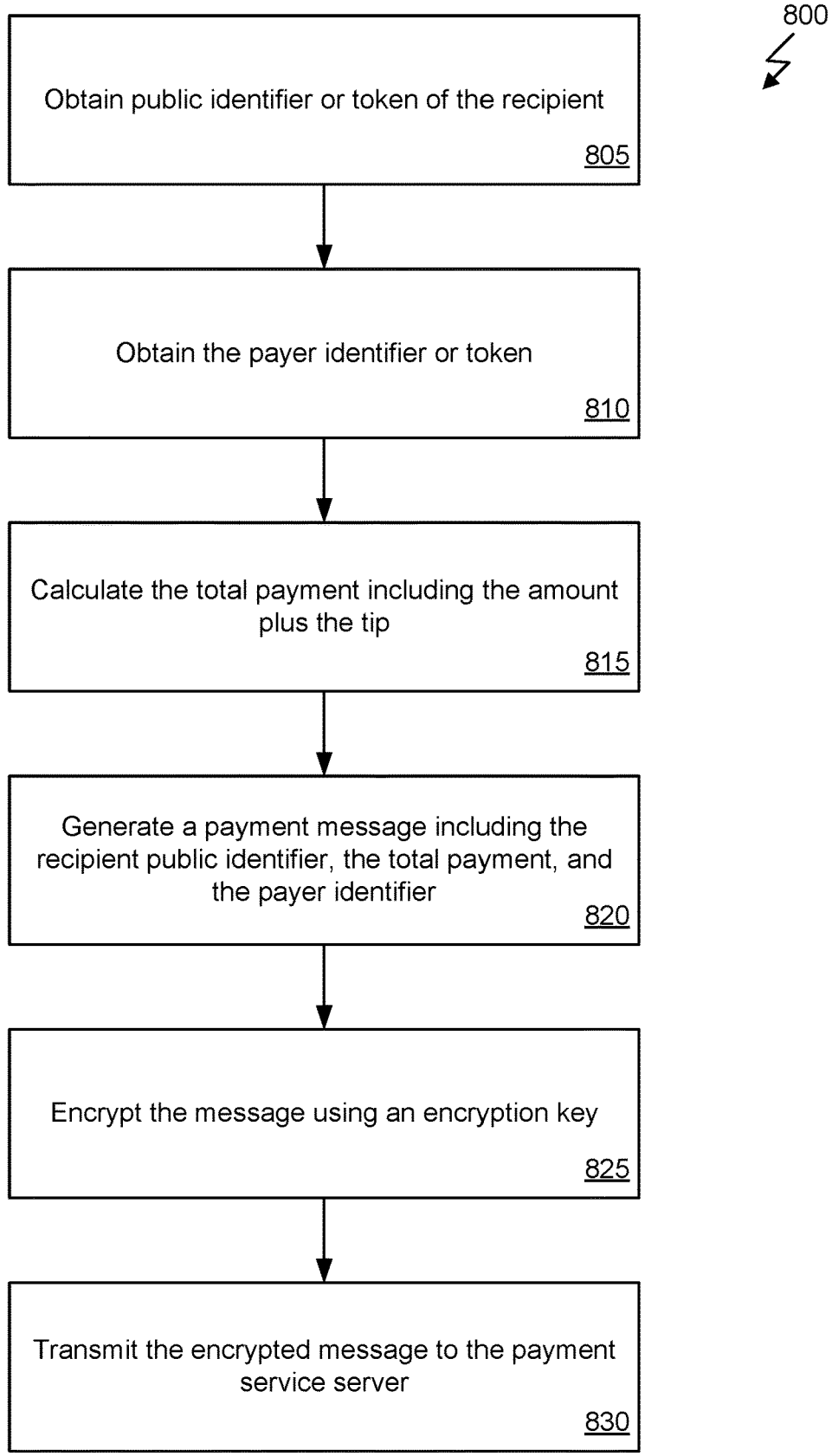
FIG. 8 illustrates an exemplary method for initiating payment from a payer device according to an embodiment.

FIG. 8 illustrates an exemplary method 800 for initiating payment from a payer device. The method 800 can be can be, for example, executed by application 205 executing on payer device 105. Method 800 can begin by obtaining the public identifier or token of the recipient at step 805. The recipient public identifier or token can be, for example, extracted from the message sent from the recipient, for example by extraction module 225 of FIG. 2. At step 810, the application can obtain the payer identifier or token. The payer can have, for example, a private identifier known to the payment service that can be included in the message for identifying the payer at the payment service server.

At step 815, the application can calculate the total payment including the amount plus the tip. The value for the amount can be obtained from the message received from the recipient. The value for the tip can be obtained from the user interface as entered by the payer. The calculation can be done by, for example, payment module 230 of FIG. 2.

At step 820, the application can generate a payment message that can include the recipient public identifier or token, the total payment, and the payer identifier. Optionally, the payment message can include a pay date, notes, an account for transferring funds from, and an anonymous flag. When selected, the anonymous flag can instruct the payment service server to hide the payer information from the recipient. For example, the payer email address, phone number, name, and/or banking information is not provided to the recipient. The payment message can be generated by, for example, payment module 230 of FIG. 2.

At step 825, the application can encrypt the payment message using an encryption key. For example, the application can know of a public key in an asymmetric key pair of which the payment service server maintains the private key. Optionally, the application can encrypt the payment message with the public key. The encryption/decryption module 220 of FIG. 2 can encrypt the payment message, for example. At step 830, the application can transmit the encrypted payment message to the payment service server. For example, the application interface 215 of FIG. 2 can transmit the encrypted payment message.

Figure 9:
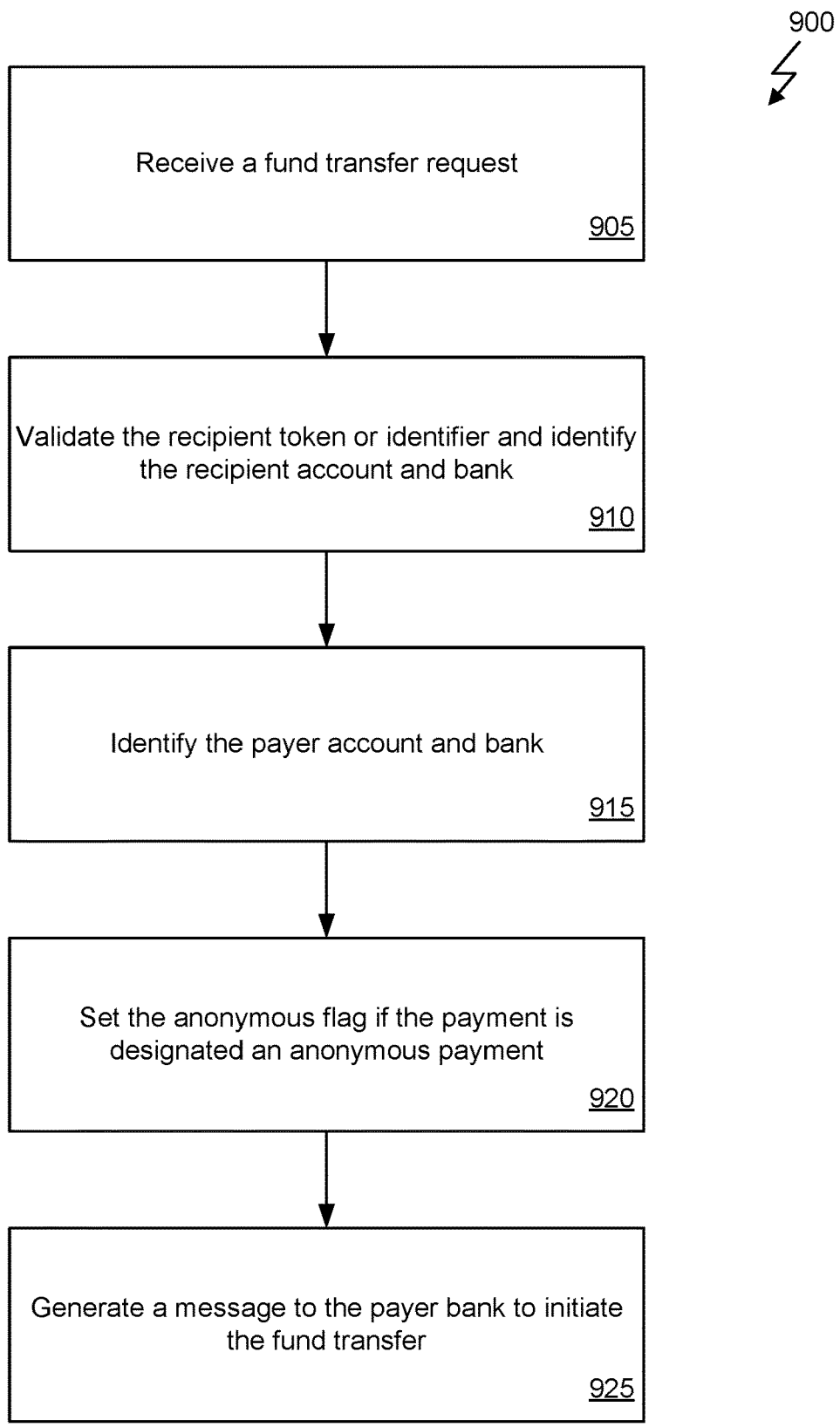
FIG. 9 illustrates an exemplary method for handing a payment request on a payment service server according to an embodiment.

FIG. 9 illustrates an exemplary method 900 for handing a payment request on a payment service server. The method 900 can be performed on, for example, payment service server 300 of FIG. 3. The method 900 can begin at step 905 with receiving a fund transfer request. The fund transfer request can be the payment message generated in method 800. At step 910, the payment service server can validate the recipient token or identifier. For example, the user directory can be used to identify the recipient account and bank based on the recipient token or identifier.

At step 915, the payment service server can identify the payer account and bank using the payer identifier or token to find the information in the user directory. At step 920, if the payment is designated as anonymous, the payment service server can set the anonymous flag associated with the entry in the user directory, for example.

At step 925, the payment service server can generate a message to the payer bank to initiate the fund transfer. The fund transfer can be completed, for example, by transfer of funds between accounts in the same bank (e.g., the payer and recipient both have the same bank) or through an automated clearing house transfer, for example. The message can include the payer account, a private identifier for the recipient, the amount, and so forth.

Figure 10:
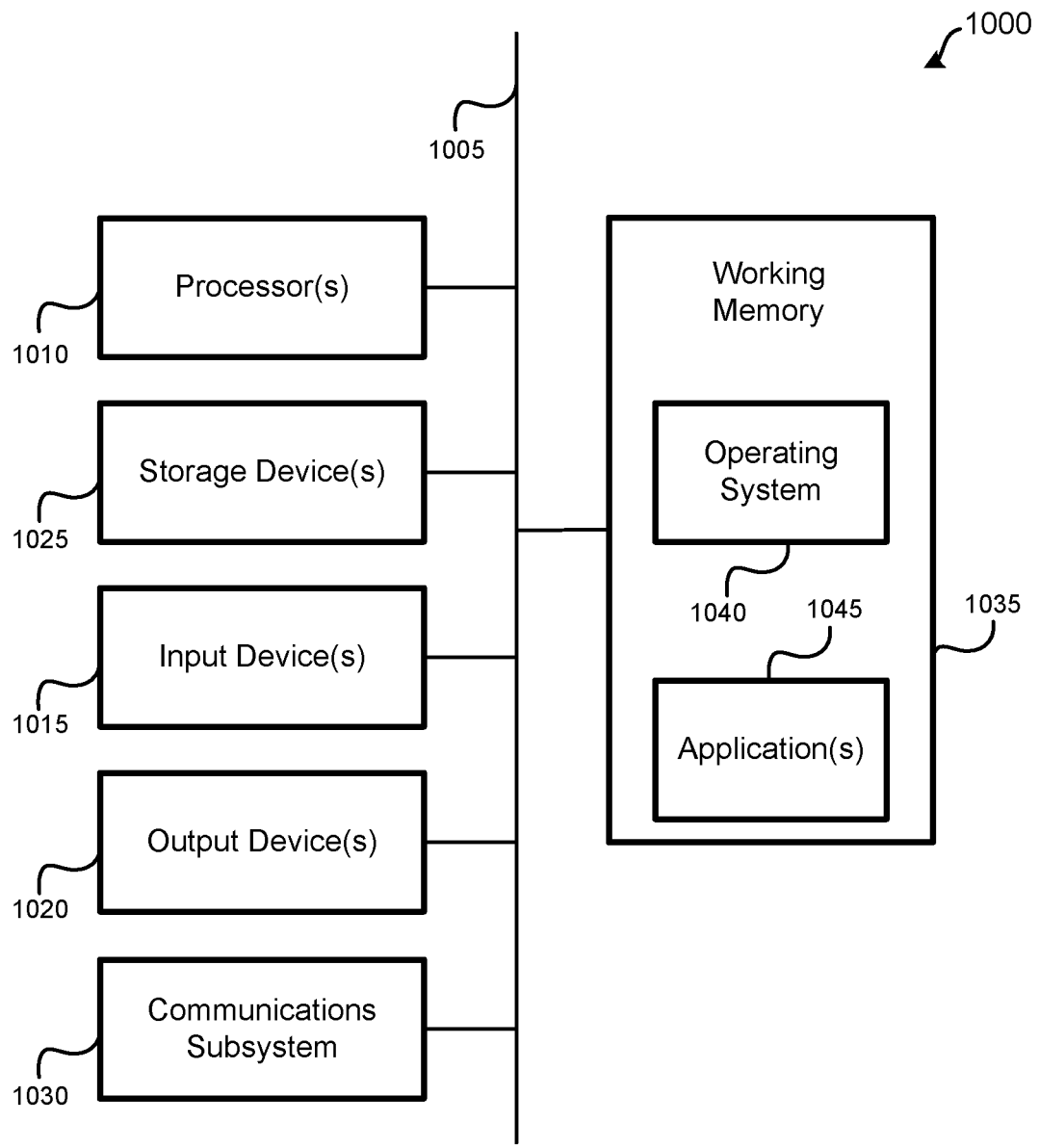
FIG. 10 illustrates an exemplary computer system.

FIG. 10 illustrates an embodiment of a computer system 1000. A computer system 1000 as illustrated in FIG. 10 may be incorporated into devices such as a mobile device, tablet, point-of-service payment device, server computer system, and the like. FIG. 10 provides a schematic illustration of one embodiment of a computer system 1000 that can perform some or all of the steps of the methods provided by various embodiments. It should be noted that FIG. 10 is meant only to provide a generalized illustration of various components, any or all of which may be utilized as appropriate. FIG. 10, therefore, broadly illustrates how individual system elements may be implemented in a relatively separated or relatively more integrated manner.

The computer system 1000 is shown comprising hardware elements that can be electrically coupled via a bus 1005, or may otherwise be in communication, as appropriate. The hardware elements may include one or more processors 1010 (e.g., processor 152 and processor 194 of FIG. 1), including without limitation one or more general-purpose processors and/or one or more special-purpose processors such as digital signal processing chips, graphics acceleration processors, and/or the like; one or more input devices 1015, which can include without limitation a mouse, a keyboard, a camera, a remote control, and/or the like; and one or more output devices 1020, which can include without limitation a display device, a printer, and/or the like.

The computer system 1000 may further include and/or be in communication with one or more non-transitory computer-readable storage devices 1025, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 1000 might also include a communications subsystem 1030, which can include without limitation a modem, a network card (wireless or wired), an infrared communication device, a wireless communication device, and/or a chipset such as a Bluetooth® device, an 802.11 device, a Wi-Fi device, a WiMax device, a near-field communication ("NFC") device, cellular communication facilities, etc., and/or the like. The communications subsystem 1030 may include one or more input and/or output communication interfaces to permit data to be exchanged with a network such as the network described below to name one example, other computer systems, and/or any other devices described herein. Depending on the desired functionality and/or other implementation concerns, a portable electronic device or similar device may communicate image and/or other information via the communications subsystem 1030. In other embodiments, a portable electronic device may be incorporated into the computer system 1000 as an input device 1015. In many embodiments, the computer system 1000 will further comprise a working memory 1035, which can include a RAM or ROM device, as described above.

The computer system 1000 also can include software elements, shown as being currently located within the working memory 1035, including an operating system 1040, device drivers, executable libraries, and/or other code, such as one or more application programs 1045, which may comprise computer programs provided by various embodiments, and/or may be designed to implement methods, and/or configure systems, provided by other embodiments, as described herein. Merely by way of example, one or more procedures described with respect to the methods discussed above, such as those described in relation to FIGS. 9 and 10, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code might be stored on a non-transitory computer-readable storage medium, such as the storage device(s) 1025 described above. In some cases, the storage medium might be incorporated within a computer system, such as computer system 1000. In other embodiments, the storage medium might be separate from a computer system (e.g., a removable medium), such as a compact disc, and/or provided in an installation package, such that the storage medium can be used to program, configure, and/or adapt a general purpose computer with the instructions/code stored thereon. These instructions might take the form of executable code, which is executable by the computer system 1000 and/or might take the form of source and/or installable code, which, upon compilation and/or installation on the computer system 1000 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 1000 to perform methods in accordance with various embodiments of the technology. According to a set of embodiments, some or all of the procedures of such methods are performed by the computer system 1000 in response to processor 1010 executing one or more sequences of one or more instructions, which might be incorporated into the operating system 1040 and/or other code, such as an application program 1045, contained in the working memory 1035. Such instructions may be read into the working memory 1035 from another computer-readable medium, such as one or more of the storage device(s) 1025. Merely by way of example, execution of the sequences of instructions contained in the working memory 1035 might cause the processor(s) 1010 to perform one or more procedures of the methods described herein. Additionally or alternatively, portions of the methods described herein may be executed through specialized hardware.

The terms "machine-readable medium," "processor-readable medium," and "computer-readable medium," as used herein, refer to any medium that participates in providing data that causes a machine to operate in a specific fashion. In an embodiment implemented using the computer system 1000, various computer-readable media might be involved in providing instructions/code to processor(s) 1010 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 1025. Volatile media include, without limitation, dynamic memory, such as the working memory 1035.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1010 for execution. Merely by way of example, the instructions may initially be carried on a magnetic disk and/or optical disc of a remote computer. A remote computer might load the instructions into its dynamic memory and transmit the instructions to working memory 1035 for execution by processor 1010 of the computer system 1000.

The communications subsystem 1030 and/or components thereof generally will receive signals, and the bus 1005 then might carry the signals and/or the data, instructions, etc. carried by the signals to the working memory 1035, from which the processor(s) 1010 retrieves and executes the instructions. The instructions received by the working memory 1035 may be stored on a non-transitory storage device 1025 before execution by the processor(s) 1010.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A method, comprising:
   receiving, at a payer mobile device associated with a payer, a first encrypted message, the first encrypted message being associated with a recipient and a payment;
   decrypting, at the payer mobile device, the first encrypted message;
   extracting, at the payer mobile device, a recipient token from the decrypted message, the recipient token comprising a unique public identifier of the recipient;
   communicating, from the payer mobile device, the recipient token to a payment service computer system;
   receiving, at the payer mobile device, a validation message from the payment service computer system indicating that the recipient token corresponds to a valid account within a database of the payment service computer system;
   upon receiving the validation message, generating a notification that the payer mobile device has all information necessary to pay the recipient;
   upon receiving the validation message, displaying, at the payer mobile device, a user interface of an application comprising a plurality of fields for entering a plurality of payment parameters, wherein the unique public identifier of the recipient is displayed in a recipient field of the plurality of fields;
   receiving, at the payer mobile device via the user interface of the application, the plurality of payment parameters;
   generating, at the payer mobile device, a second encrypted message comprising instructions to make the payment to an account of the recipient from an account of the payer according to the plurality of payment parameters, the recipient token, and a flag that indicates that the payment should be anonymous, the second encrypted message further comprising a token associated with the payer, the token associated with the payer comprising a private unique identifier known to the payment service computer system, wherein one or both of the first encrypted message and the second encrypted message are secured by adding a time-dependent value to the respective encrypted message;

transmitting, from the payer mobile device, the second encrypted message to the payment service computer system;

receiving, at the payment service computer system, the second encrypted message;

identifying, by the payment service computer system, account information associated with the recipient based on the recipient token;

identifying, by the payment service computer system, account information associated with the payer based on the token associated with the payer; and generating a payment message to a payer bank associated with the account information associated with the payer, the payment message comprising an anonymous flag that indicates that the payment should be made by the payer bank should be anonymous.

2. The method of claim 1, wherein the first encrypted message is received from a second mobile device.

3. The method of claim 1, further comprising:
reading, at the payer mobile device, a barcode containing the first encrypted message from a second mobile device.

4. The method of claim 3, wherein the second mobile device comprises a recipient mobile device.

5. The method of claim 1, wherein the first encrypted message is received from a second mobile device using near field communication (NFC).

6. The method of claim 1, wherein the first encrypted message is received from a second mobile device using Bluetooth® communication.

7. The method of claim 1, wherein the plurality of parameters comprises a tip field.

8. The method of claim 7, wherein the first encrypted message comprises a payment amount, the method further comprising:
extracting, at the payer mobile device, the payment amount from the decrypted message; and
displaying the payment amount in a payment amount field of the plurality of fields, wherein:
generating the second encrypted message further comprises instructions to send a total payment comprising a value of a tip parameter plus the payment amount from the account of the payer to the account of the recipient.

9. A non-transitory, processor-readable medium having stored thereon instructions which, when executed by one or more processors, cause the one or more processors to perform operations comprising:
receiving a first encrypted message, the first encrypted message associated with a recipient and a payment;
decrypting the first encrypted message;
extracting a recipient token from the decrypted message, the recipient token comprising a unique public identifier of the recipient;
communicating the recipient token to a payment service computer system;
receiving a validation message from the payment service computer system indicating that the recipient token corresponds to a valid account within a database of the payment service computer system;
upon receiving the validation message, generating a notification that all information necessary to pay the recipient has been received;
upon receiving the validation message, displaying a user interface of an application comprising a plurality of payment parameter fields and the unique public identifier of the recipient;
receiving via the plurality of payment parameter fields of the user interface of the application, a plurality of payment parameters;
generating a second encrypted message comprising instructions to make the payment to an account of the recipient from an account of a payer according to the plurality of payment parameters, the recipient token, and an anonymous flag that causes the payment to be made while hiding payer information from the recipient the second encrypted message further comprising a token associated with the payer, the token associated with the payer comprising a private unique identifier known to the payment service computer system, wherein one or both of the first encrypted message and the second encrypted message are secured by adding a time-dependent value to the respective encrypted message;
transmitting the second encrypted message to a payment service computer system;
receiving, at the payment service computer system, the second encrypted message;
identifying, by the payment service computer system, account information associated with the recipient based on the recipient token;
identifying, by the payment service computer system, account information associated with the payer based on the token associated with the payer; and
generating a payment message to a payer bank associated with the account information associated with the payer, the payment message comprising an anonymous flag that indicates that the payment should be made by the payer bank should be anonymous.

10. The non-transitory, processor-readable medium of claim 9, wherein the first encrypted message is received from a mobile device.

11. The non-transitory, processor-readable medium of claim 9, wherein the instructions comprise further instructions that, when executed by the processor, cause the processor to perform operations comprising:
reading a barcode containing the first encrypted message from a recipient mobile device.

12. The non-transitory, processor-readable medium of claim 9, wherein the first encrypted message is received from a mobile device using near field communication (NFC).

13. The non-transitory, processor-readable medium of claim 9, wherein the first encrypted message is received from a mobile device using Bluetooth communication.

14. The non-transitory, processor-readable medium of claim 9, wherein the first encrypted message comprises a payment amount, and wherein the instructions comprise further instructions that, when executed by the processor, cause the processor to perform operations comprising:
extracting the payment amount from the decrypted message; and
displaying the payment amount in a payment amount field of the plurality of payment parameter fields, wherein:
generating the second encrypted message further comprises instructions to send a total payment comprising a value of a tip parameter plus the payment amount from the account of the payer to the account of the recipient.

15. The method of claim 1, wherein the unique public identifier comprises at least one of an email address of the recipient, a telephone number of the recipient, or a randomly assigned unique identifier associated with the recipient.

16. The non-transitory, processor-readable medium of claim 9, wherein the unique public identifier comprises at least one of an email address of the recipient, a telephone number of the recipient, or a randomly assigned unique identifier associated with the recipient.

17. The method of claim 3, wherein the barcode comprises at least one of a numeric barcode, an alphanumeric barcode, or a matrix barcode.

18. The non-transitory, processor-readable medium of claim 11, wherein the barcode comprises at least one of a numeric barcode, an alphanumeric barcode, or a matrix barcode.

19. The method of claim 1, wherein the payer mobile device comprises at least one of a smartphone, a tablet, a smartwatch, or a laptop computer.

20. The method of claim 1, wherein the validation message comprises a public display name associated with the recipient that is displayed on the payer mobile device.

\* \* \* \* \*